March 14, 1967  W. SCHLUETER  3,309,157
ONE-ROW RADIAL AND THRUST BALL BEARING
Filed Jan. 13, 1965  2 Sheets-Sheet 1

INVENTOR

United States Patent Office 3,309,157
Patented Mar. 14, 1967

3,309,157
ONE-ROW RADIAL AND THRUST
BALL BEARING
Wilhelm Schluefer, Dortmund, Germany, assignor to Eisenwerk Rothe Erde G.m.b.H., Dortmund, Germany
Filed Jan. 13, 1965, Ser. No. 425,352
Claims priority, application Germany, Jan. 13, 1964, E 26,212
4 Claims. (Cl. 308—230)

The present invention relates to a one-row radial and thrust ball bearing with offset gaps between the two race rings and elastic spacers between the balls, in which each of the race-way surfaces of each ring is constructed in such a manner so that each ball makes a four-point contact with the race-way surfaces. Ball bearings of this type are especially useful in machines such as steam shovels, cranes, etc., that is in machines in which the member supported by the ball bearing is subjected to eccentric axial forces.

Ball bearings of this type as mentioned above are known. The known ball bearings of this type are, however, constructed in such a manner that the contact angles between ball and race-way surfaces are equal, so that offset gaps between the race rings may lead to a dangerous situation in that at certain loads a shifting of the contact points between ball and race surface may take place so that pressure at the edges of the races may occur which may lead to a destruction of the race surfaces. It is one object of the present invention to overcome this disadvantage of ball bearings of this type known in the art and to provide a ball bearing in which shifting of the contact points between the balls and race-way surfaces toward the edges of the raceway surfaces is prevented or at least reduced to a minimum.

It is a further object of the present invention to provide a ball bearing of the type mentioned which combines the advantages of a double-row ball bearing, i.e., great carrying capacity and perfect ball guidance, with the advantage of a one-row ball bearing, i.e., small space requirements.

According to the present invention each race ring is provided with a pair of race-way surfaces, called hereinafter carrying and holding race surfaces, which respectively contact the balls at different contact angles calculated according to the ratio of the forces acting on the bearing. The contact angles are calculated to equalize the pressure on the carrying and holding race surfaces when the bearing is loaded by an eccentric axial load.

The gaps between the race surfaces of the two race rings are offset in opposite directions from the centers of the balls and transverse to the axis of the bearing in such a manner that the contact points between balls and race surfaces cannot move up to the edges of the race surfaces defining the gaps.

The radii of curvature of the race surfaces in radial planes including the bearing axis are constructed in such a manner that each ball, when the bearing is under load, will engage each race ring substantially at two points.

The rolling speed of the balls for different bearing loads can be calculated for the whole circumference of the bearing. The balls of the ball bearings of the present invention are separated from each other by elastic spacers and the elasticity of the spacers which maintain the balls spaced from each other is to be chosen according to the difference between the minimum and maximum rolling speed of each ball during one revolution of the bearing. The spacers may have various forms known in the art, and their only task in the ball bearing of the present invention is to absorb the different speeds of the balls and to bring the balls in the unloaded region of the bearing again into their original position. The bearings therefore have the advantage that substantially no sliding friction will occur under load. The bearings may be constructed as two-piece bearings with a filling plug for the balls, or as a three-piece bearing with a divided inner or outer race ring or with castellations on the inner and outer race ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
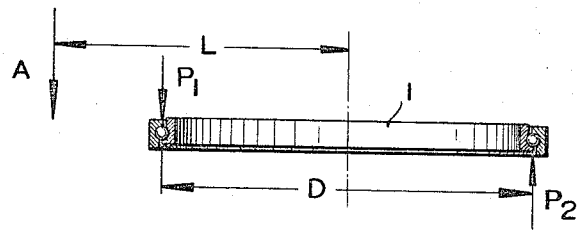
FIG. 1 is a schematic view illustrating the application of an eccentric axial load to a ball bearing.

FIG. 1 schematically illustrates a one-row radial and thrust ball bearing subjected at a given instance to an eccentric load A applied at a distance L from the axis of the bearing in a direction parallel to the bearing axis, as may for instance occur in a crane. Such a load will produce at the left side of the bearing, as viewed in FIG. 1, a force $P_1$ and on the right side an opposite force $P_2$.

If the diameter of the bearing is D, then $$A\left(L+\frac{D}{2}\right)=P_1\times D$$

and $$A\left(L-\frac{D}{2}\right)=P_2\times D$$

from which the forces $P_1$ and $P_2$ may be calculated as follows:

$$P_1=\frac{A}{2}\left(\frac{2L}{D}+1\right)$$

and $$P_2=\frac{A}{2}\left(\frac{2L}{D}-1\right)$$

Figure 2:
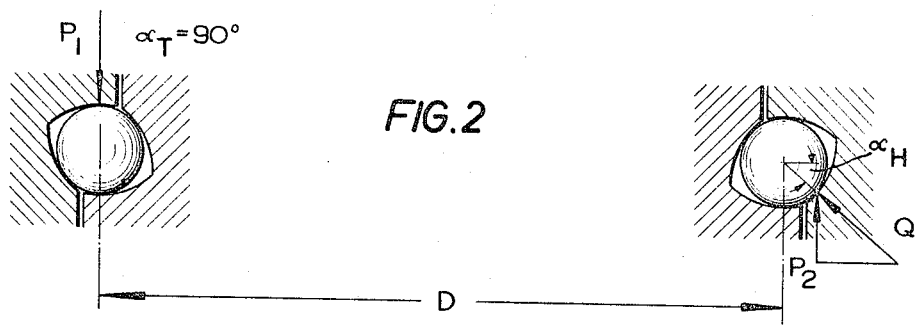
FIG. 2 is a schematic cross section through the left and right end of a ball bearing according to the present invention and illustrating the forces occurring therein when an eccentric axial load as shown in FIG. 1 is applied thereto.

Each of the race rings is provided with a pair of concavely curved race surfaces, that is a carrying race surface and a holding race surface, and if the angle of contact between a ball and a carrying race surface is designated with $\alpha_T$ and that between a ball and a holding race surface with $\alpha_H$, as shown in FIG. 2, then the angle $\alpha_H$ for a pressure Q on the holding race surface to be equal to the pressure $P_1$ on the carrying race surface, and an assumed angle $\alpha_T=90°$ can be calculated as follows:

$$P_1=Q=\frac{P_2}{\sin \alpha_H}$$

and $$\sin \alpha_H=\frac{P_2}{Q}=\frac{P_2}{P_1}$$

Therefore if the values for $P_1$ and $P_2$ as mentioned above are placed in this formula, $$\sin \alpha_H=\frac{\frac{A}{2}\left(\frac{2L}{D}-1\right)}{\frac{A}{2}\left(\frac{2L}{D}+1\right)}=\frac{\frac{2L}{D}-1}{\frac{2L}{D}+1}$$

Figure 3:
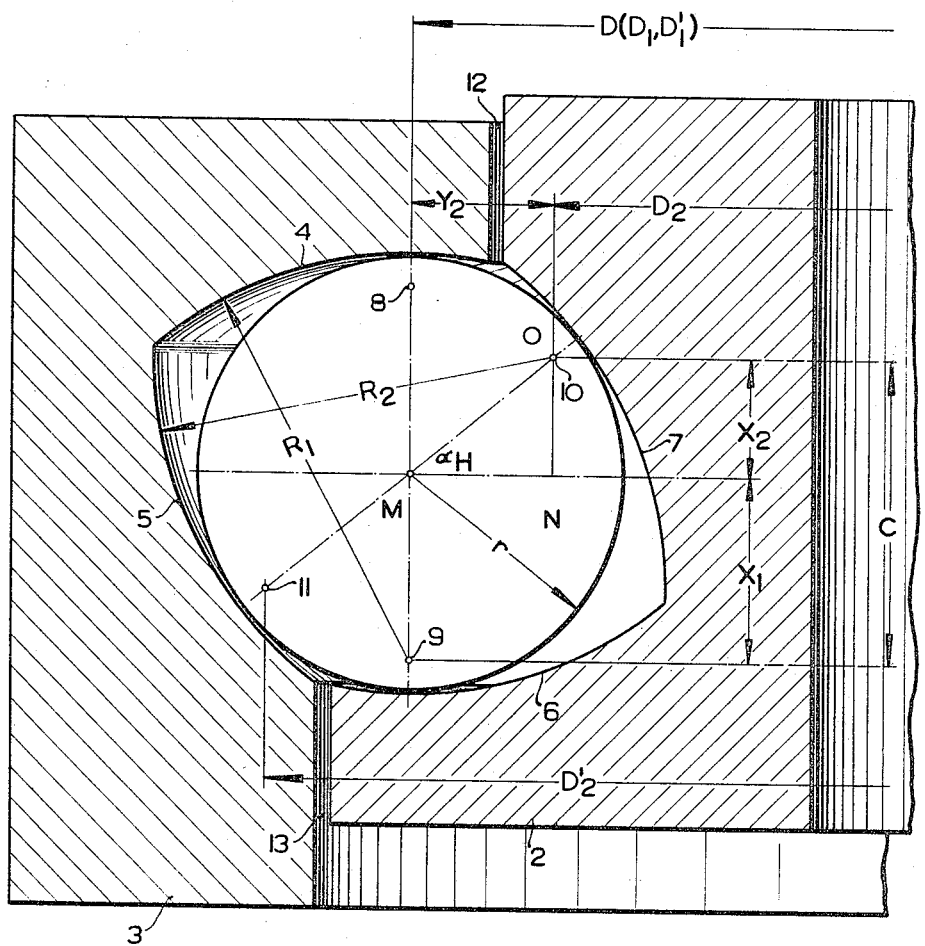
FIG. 3 is a partial axial cross section through a bearing of the present invention, drawn to an enlarged scale.

Referring now to FIG. 3, it will be seen that the one-row radial and thrust ball bearing according to the present invention comprises an inner ring 2 and an outer ring 3. Each of the rings has two race-way surfaces, i.e., the carrying race surface 4 and the holding race surface 5 of the outer ring 3 and the carrying race surface 6 and the holding race surface 7 of the inner ring 2. The radii of the circles of curvature of the race surfaces in radial planes including the bearing axis are designated respectively with $R_1$ and $R_2$. The centers 8 of the circles of curvature of the carrying race surface 6 of the inner ring and the centers 9 of the circles of curvature of the carrying race surface 4 of the outer ring are respectively located on circles concentric with the bearing axis and having respectively diameters $D_1$ and $D_1'$ which are equal to the diameter $D$ of the circle on which the centers M of the balls are located. The centers 10 of the circles of curvature of the holding race surface 5 of the outer ring 3 are located on a circle concentric with the bearing axis and having a diameter $D_2$ and the centers 11 of the circles of curvature of the holding race surface 7 of the inner ring 2 are located on a circle concentric with the bearing axis and having a diameter $D_2'$.

The offset gaps between the rings are designated with 12 and 13.

The diameters $D_2$ and $D_2'$ of the circles on which the centers of curvature of the holding race surfaces 5 and 7 are respectively located can be calculated as follows:

$$D_2 = D - 2y_2$$

and $$D_2' = D + 2y_2$$

From the triangle MNO follows that:

$$\cos \alpha_H = \frac{y_2}{R_2 - r}$$

whereby $r$ is the radius of the ball as shown in FIG. 3 and therefore $$y_2 = (R_2 - r) \cos \alpha_H$$

The diameter $D_2$ of the circle on which the centers of the circles of curvature of the holding race surface 5 are located will therefore be:

$$D_2 = D - 2(R_2 - r) \cos \alpha_H$$

and the diameter $D_2'$ of the circle on which the centers of the circles of curvature of the holding race surface 7 are located will be:

$$D_2' = D + 2(R_2 - r) \cos \alpha_H$$

The axial distance $c$ of the circles on which the centers of the circles of curvature of the holding race and carrying race surfaces of the inner and outer ring are located can be calculated as follows:

$$c = x_1 + x_2$$

whereby $x_1 = R_1 - r$ and $$x_2 = (R_2 - r) \sin \alpha_H$$

so that $c = R_1 - r + (R_2 - r) \sin \alpha_H$.

If $R_1$ is assumed to be equal to $R_2$, the dimension $c$ will be $$c = R_2 - r + (R_2 - r) \sin \alpha_H = (R_2 - r) = (1 + \sin \alpha_H)$$

The balls of the bearing according to the present invention are separated by elastic spacers not shown in the drawing.

The bearing may be connected at opposite sides by screws to a support or welded on one side thereto and the bearing may be constructed as a two-part or a three-part bearing.

It will be understood that each of the elements described above, or two or more together, may also find a useful application in other types of one-row radial and thrust ball bearings differing from the types described above.

While the invention has been illustrated and described as embodied in a one-row radial and thrust ball bearing in which each of the race rings has a concavely curved carrying race surface and a concavely curved holding race surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

In the bearing according to the present invention in which bearing each race ring is provided with a pair of race-way surfaces, the circle of curvature of the concavely curved carrying race surface and the circle of curvature of the concavely curved holding race surface have both a radius of equal length, the centers of these radii are located on two different points of a circle; so that the said carrying race surface comes together at an angle with the said holding race surface.

What is claimed as new and desired to be secured by Letters Patent is:

1. A one-row radial and thrust ball bearing comprising, in combination, an outer race ring; an inner race ring, each of said race rings having a concavely curved carrying race surface and a concavely curved holding race surface; and a single row of balls located between said race rings and engaging said race surfaces, the race surfaces of each ring intersect any radial plane including the axis of the bearings along portions of a circle having respectively a radius of curvature greater than that of the balls so that each of said balls engages each of said race surfaces substantially at a point, the centers of the circles of curvature of the carrying race surfaces of the inner and outer race rings being respectively located on circles concentric with the axis of the bearing and having a diameter equal to that of the circle at which the centers of the balls are located.

2. A one-row radial and thrust ball bearing comprising, in combination, an outer race ring; an inner race ring, each of said race rings having a concavely curved carrying race surface and a concavely curved holding race surface; and a single row of balls located between said race rings and engaging said race surfaces, the race surfaces of each ring intersect any radial plane including the axis of the bearings along portions of a circle having respectively a radius of curvature greater than that of the balls so that each of said balls engages each of said race surfaces substantially at a point, the centers of the circles of curvature of the carrying race surfaces of the inner and outer race rings being respectively located on circles concentric with the axis of the bearing and having a diameter equal to that of the circle at which the centers of the balls are located and the centers of the circles of curvature of the holding race surface of the outer ring being located on a circle concentric with the axis of the bearing and having a diameter smaller than that of the circle at which the centers of the balls are located and the centers of the circles of curvature of the holding race surface of the inner ring being located on a circle concentric with the axis of the bearing and having a diameter greater than that of the circle at which the centers of the balls are located.

3. A one-row radial and thrust ball bearing comprising, in combination, an outer race ring; an inner race ring, each of said race rings having a pair of concavely curved race surfaces; and a single row of balls located between said race rings and engaging said race surfaces, the race surfaces of each ring intersect any radial plane including the axis of the bearings along portions of a circle having respectively a radius of curvature greater than that of the balls so that each of said balls engages each of said race surfaces substantially at a point, said inner and outer race rings being separated by gaps and the gaps on opposite sides of the balls being offset with respect to each other in direction transverse to the bearing axis.

4. A one-row radial and thrust ball bearing comprising, in combination, an outer race ring; an inner race ring, each of said race rings having a concavely curved carrying race surface and a concavely curved holding race surface; and a single row of balls located between said race rings and engaging said race surfaces, the race surfaces of each ring intersect any radial plane including the axis of the bearings along portions of a circle having respectively a radius of curvature greater than that of the balls so that each of said balls engages each of said race surfaces substantially at a point, the centers of the circles of curvature of the carrying race surfaces of the inner and outer race rings being respectively located on circles concentric with the axis of the bearing and having a diameter equal to that of the circle at which the centers of the balls are located and the centers of the circles of curvature of the holding race surface of the outer ring being located on a circle concentric with the axis of the bearing and having a diameter smaller than that of the circle at which the centers of the balls are located and the centers of the circles of curvature of the holding race surface of the inner ring being located on a circle concentric with the axis of the bearing and having a diameter greater than that of the circle at which the centers of the balls are located, said inner and outer race rings being separated by gaps and the gap on one side of the balls being located between the contact points of the balls and the carrying race surface of the outer race ring and that of the holding race surface of the inner ring and the gap of the other side of the balls being located between the contact points of the ball and the carrying race surface of the inner ring and that of the holding race surface of the outer ring.

References Cited by the Examiner
UNITED STATES PATENTS
3,058,789  10/1966  Ham _____ 308—199

FOREIGN PATENTS
811,177  4/1959  Great Britain.
467,552  12/1951  Italy.

MARTIN P. SCHWADRON, *Primary Examiner.*
FRANK SUSKO, *Examiner.*

Disclaimer 3,309,157.—*Wilhelm Schlueter*, Dortmund, Germany. ONE-ROW RADIAL AND THRUST BALL BEARING. Patent dated Mar. 14, 1967. Disclaimer filed May 27, 1968, by the assignee, *Eisenwerk Rothe Erde G.m.b.H.*

Hereby enters this disclaimer to claim 3 of said patent.
[*Official Gazette October 8, 1968.*]